Dec. 10, 1946. C. J. DELEGARD ET AL 2,412,445
APPARATUS FOR DECORTICATING FIBERS
Filed Jan. 7, 1943 3 Sheets-Sheet 1
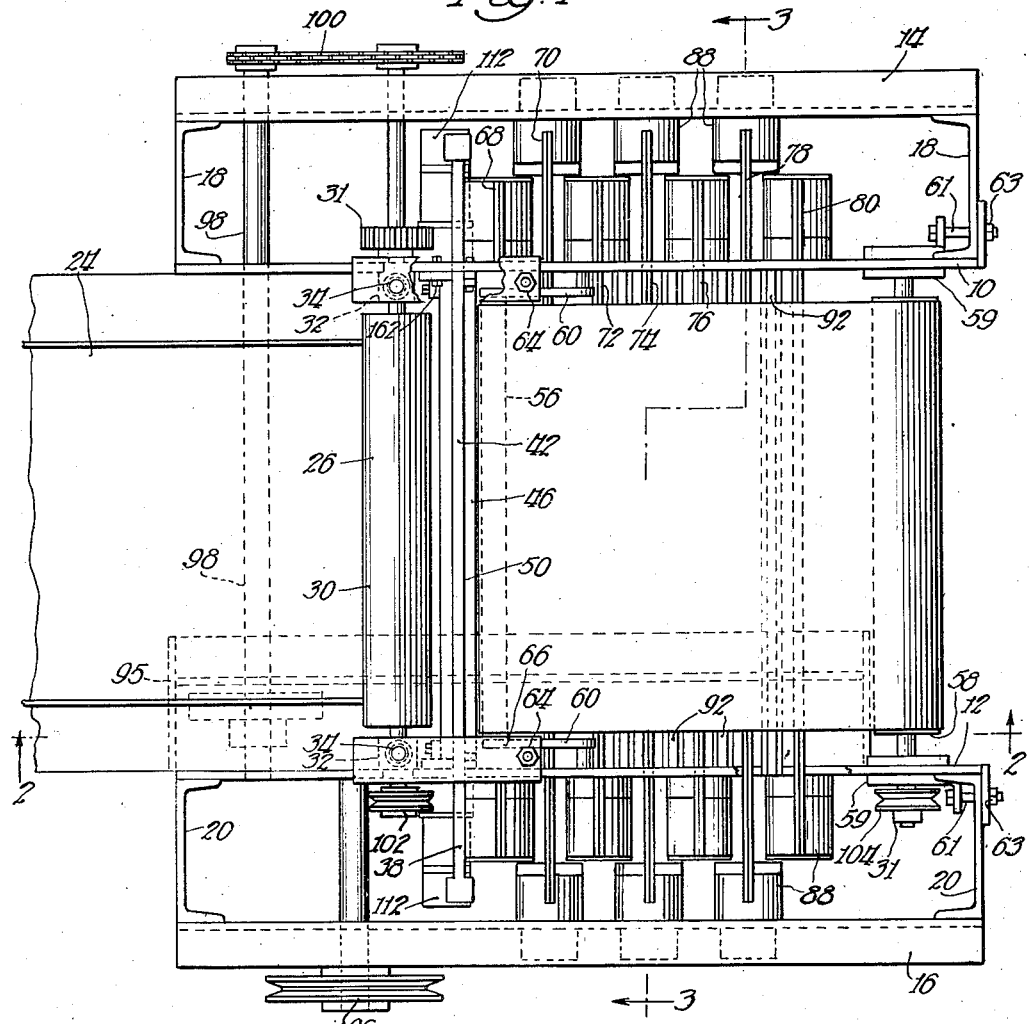
Inventors:
Carl J. Delegard
Rudolph Kreutz
By: Freeman, Sweet, Albrecht
and Williams Atty.

Dec. 10, 1946.  C. J. DELEGARD ET AL  2,412,445
APPARATUS FOR DECORTICATING FIBERS
Filed Jan. 7, 1943  3 Sheets-Sheet 2
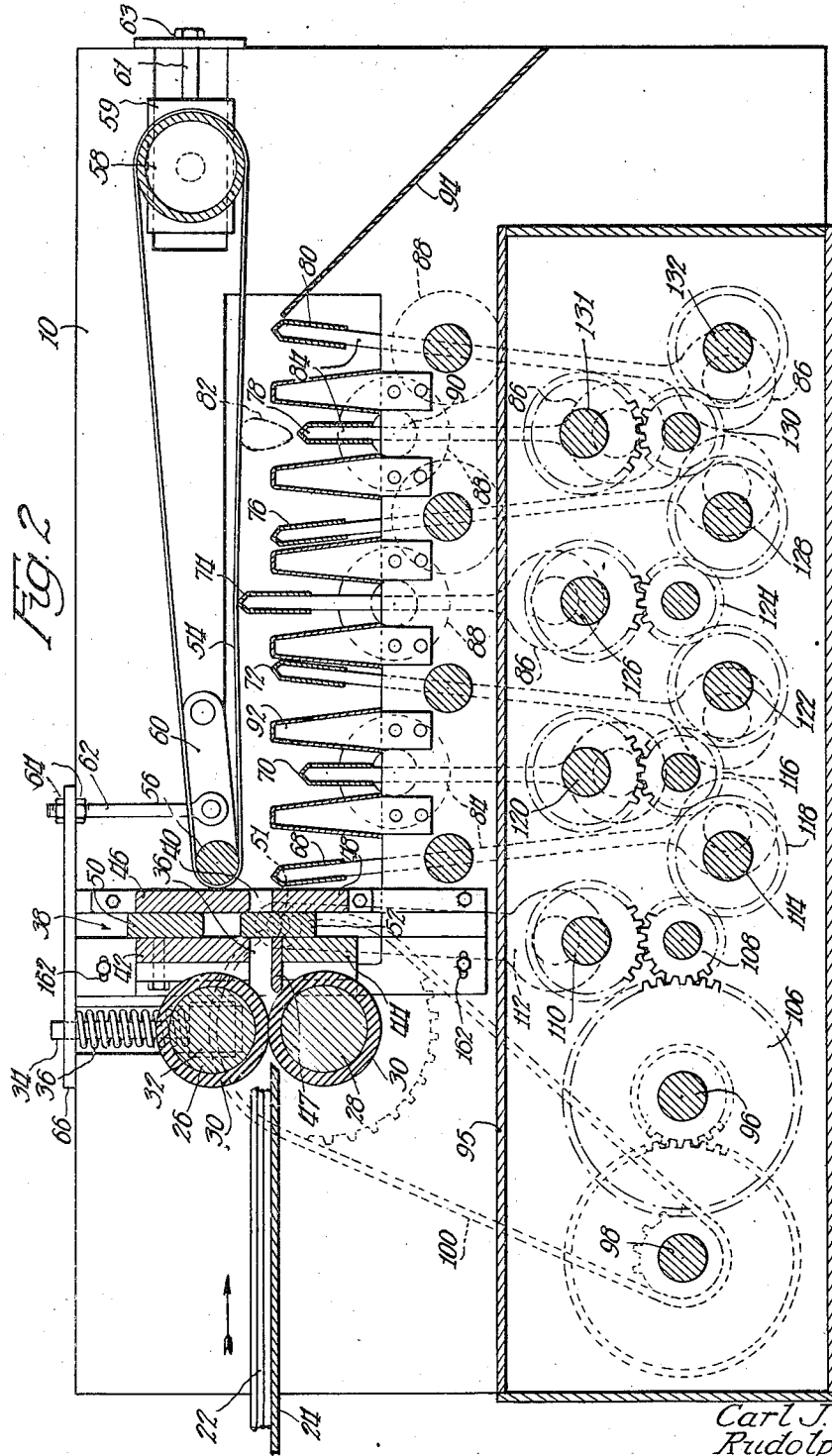
Inventors
Carl J. Delegard
Rudolph Kreutz
By: Freeman Sweet Albrecht
and Williams  Atty

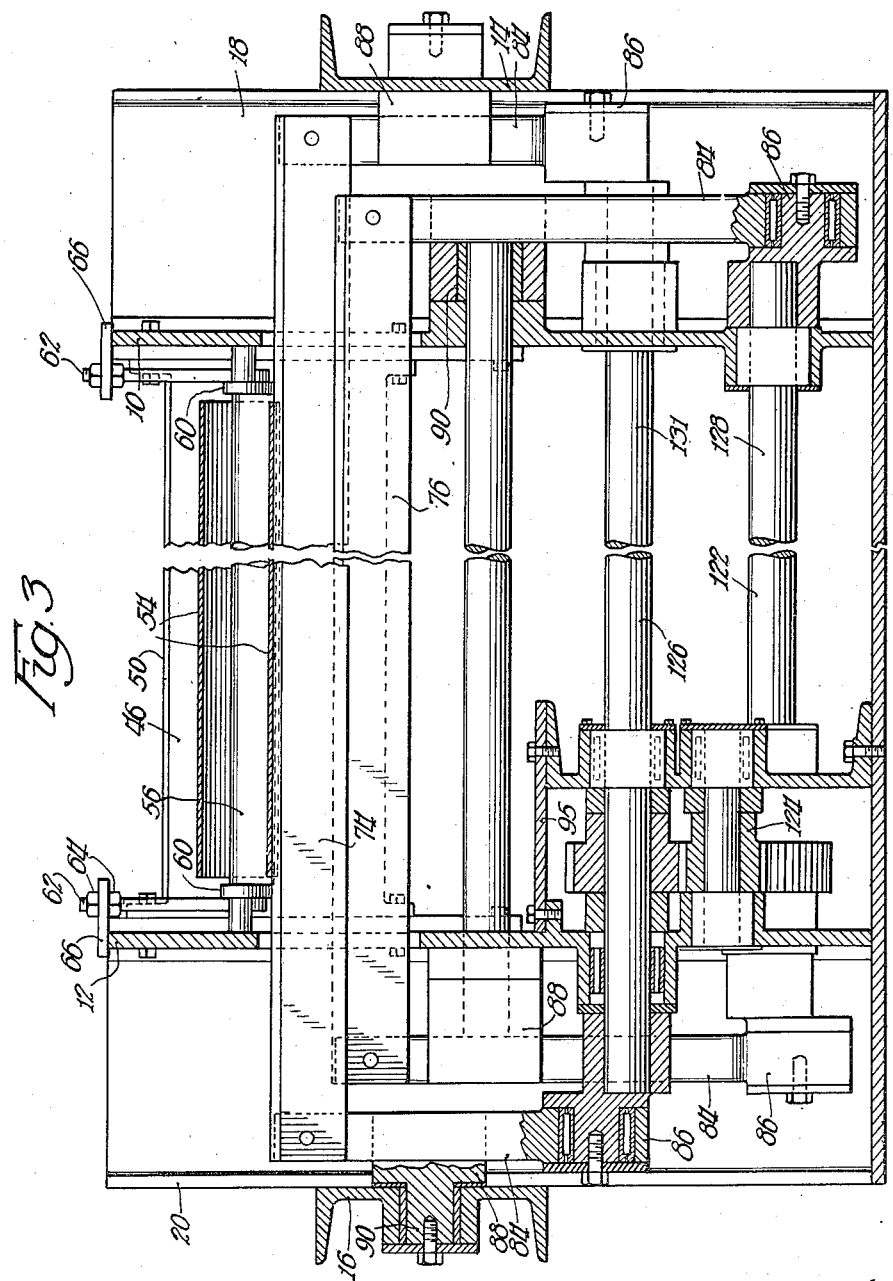

Patented Dec. 10, 1946

2,412,445

UNITED STATES PATENT OFFICE 2,412,445

APPARATUS FOR DECORTICATING FIBERS

Carl J. Delegard, Chicago, and Rudolph Kreutz, River Grove, Ill.

Application January 7, 1943, Serial No. 471,632

3 Claims. (Cl. 19—21)

Our invention relates to the decortication of flax, hemp, and similar bast fibers, and includes among its objects and advantages the substantially complete elimination of the production of tow. In the brakes common in the prior art, the material passing through was not only snarled to such an extent as to produce a substantial percentage of tow, but after leaving the brake it had to be gathered in hanks and scutched and otherwise processed to complete the separation of hurds. According to the invention, the stalks are broken and scutched in substantially the same unitary operation. An incidental advantage is the production of a continuous hank or strand of fiber ready for use in the rope-making machine rather than a number of individual hanks requiring subsequent trimming.

In the accompanying drawings:

Figure 1 is a plan view of an illustrative machine according to the invention;

Figure 2 is a section on line 2—2 of Figure 1;

Figure 3 is a section on line 3—3 of Figure 1; and

Figure 4 is a diagram of the process and apparatus for forming hanks of indefinite length.

In the embodiment of the invention selected for illustration, the framework of the machine is built up primarily from two side plates 10 and 12. On the outside of each side plate is a pivot support consisting of channels 14 and 16 offset from the adjacent side members by spacers 18 and 20.

The material to be processed is ordinarily a pile of round stalks diagrammatically indicated at 22 in Figure 2. The stalks are slid across the feed table 24 and between an upper guide roller 26 and a lower guide roller 28. Each guide roller is illustrated as provided with a rubber facing 30. The lower guide roller is in fixed bearings in the frame, and the upper guide roller is journaled on blocks 32 each carried at the lower end of a slidable plunger 34 and pressed downwardly by a suitable compression spring 36. The pressure of the guide rolls is preferably adjusted to secure a firm grip on the material, and usually this grip is sufficient to crush the material slightly, although such preliminary crushing is not in any way essential. After passing through the guide rollers, the material enters the gate at 38, and after being acted on by the reciprocating breaker indicated as a whole by the reference character 38, issues through the gate 40. The gate 36 is defined by an upper stationary guide bar 42 and a lower stationary guide bar 44 equipped with a short lip 47 extending over close to the feed rolls. Similarly, the exit gate 40 is defined by an upper stationary guide bar 46 and a lower stationary guide bar 48. The breaker 38 is an integral form, the operative portion of which comprises the upper cross piece 50 and the lower cross piece 52. In Figure 2 the parts are illustrated with the breaker in the highest position it reaches in use, and the lowest position is with the lower edge of the bar 50 in the position indicated by the dotted line 51 in Figure 2. Thus the stalk passing through is first pinched into a downwardly opening U shape by the lower cross piece 52, and then, as the breaker moves down to the lower position, there is a period when the passage through both gates stands open and the material can advance, followed by pinching of the material into an upwardly opening U shape by the downward movement of the upper cross piece 50. Working with hemp stalks having butt diameters of roughly $\frac{3}{16}''$ or $\frac{1}{4}''$, we have secured good results with feeds of the order of magnitude of 36 feet per minute, and reciprocatory speeds for the breaker such that successive pinchings are spaced apart by a distance of approximately the same magnitude as the diameter of the stalk. However, depending on the character of the stalk being processed, a considerable variation in this proportion can still secure good results. The material issuing through the gate 40 includes all the fiber that was originally in the periphery of the stalk, now split longitudinally into filaments but not appreciably tangled, and all the pith which previously constituted the body of the stalk broken into fine, short particles only a few of which are still adhering somewhat to one or more of the fibers.

The issuing strand of fibers now passes along in substantially continuous contact with the lower surface of the lower reach 54 of a flexible fabric belt which passes around a small intake guide roller 56 and a larger guide roller 58 at the discharge end. The guide roller 56 is adjustable as to height, being carried on pivoted arms 60 with the angular position of each arm controlled by the hanger bolt 62 which may be adjusted by means of the nuts 64 engaging the upper and lower surfaces of the bracket 66. To adjust the tension of the belt 54, the ends of the roller 58 are journaled in slides 59 which may be adjusted in horizontal direction by tension bolts 61 and adjusting nuts 63.

As the fiber passes along under the belt, it is kept in contact with the belt and simultaneously combed and moved along toward the discharge end by a series of scutching bars 68, 70, 72, 74, 76, 78, and 80. Each of these bars is a deep downwardly opening sheet metal channel with a V-shaped bight, the apex of which engages the overlying fiber and the belt 54. The path of motion of each bar is indicated in dotted lines at 82, and is generally egg-shaped, with a relatively large component of motion to the right during the period of contact with the belt. To produce this motion each bar is supported on pitmans 84 at its ends, and each pitman has its lower end journaled on a crank 86 so that the lower end of the pitman describes a circular path. At an intermediate point above the crank 86, each pitman slides in a guide block 88 journaled on a pintle at 90. Between each bar and the succeeding bar, we provide a stationary support 92 which is also a U-shaped sheet metal bar opening downwardly, with a flat bight at the top. The bights of these bars afford an interrupted grid functioning as a floor below which the fibers will not fall, but when the machine is operating at speed the fibers rarely get down into contact with the supports because they are struck up against the belt 54 at such frequent intervals by the scutching bars. With feeds of the order of magnitude of 36 feet per minute, we have found speeds of from 800 to 1200 R. P. M. suitable for the cranks 86 which drive the scutching bars.

Immediately after leaving the gate 40 nearly all the loose hurds fall down between the supports 92 where they may collect under the machine and be removed, as by a suitable conveyor (not shown). And the minor fraction of hurds still attached to fibers with sufficient firmness to carry the weight of the tiny fragment, is dislodged, usually by the first two or three combings, and find their way downward to join the rest of the hurds. We have illustrated an inclined discharge table 94 down which the strand of finished fiber may slide enroute to the next step in processing.

We have illustrated suitable actuating mechanism for the working parts hereinbefore described. A single gear box 95 encloses all the gearing connecting the various shafts involved. The shaft 96 may receive power from any suitable source and has a gear and pinion connection with the lower feed shaft 98 from which a belt or sprocket 100 transmits motion at reduced rotary speed to the lower feed roller 26. The upper feed roller may be actuated by a pinion 31 meshing with a duplicate pinion on the lower roller. At one end it carries a sheave 102 which connects with a sheave 104 on the roller 58 to actuate the belt 54. The wiping action of the scutching bars tends to assist the movement of the belt 54.

A gear 106 on the drive shaft 96 actuates a pinion 108, and the pinion 108 meshes with two gears, one of which drives shaft 110 which actuates the beater through connecting rods 112, and the other of which drives the shaft 114 which actuates the pitmans 84 for the first scutching bar 68. The next pinion 116 functions in a manner identical with the pinion 108, receiving power from the gear 118 and shaft 114 and driving the shaft 120 for the beater bar 70, and the shaft 122 for the beater bar 72. And this transmission is repeated twice more in the same way with the pinion 124 actuating the shaft 126 for the scutching bar 74, and shaft 128 for the scutching bar 76. And the last pinion 130 drives the shaft 131 for the scutching bar 78 and the shaft 132 for the scutching bar 80. To secure a compact arrangement, the eight drive shafts are arranged at two levels, and the scutching bars 68, 72, 76, and 80 have to be on longer pitmans than the scutching bars 70, 74, and 78. However, by mounting the guide blocks 88 for the scutching bars with long pitmans, slightly lower than the guide blocks for the scutching bars with short pitmans, the path of movement of all the pitmans is substantially that indicated at 82. The difference between the sharp curvature at the bottom end of the path and the larger curvature at the upper end of the path will be slightly greater with the short pitmans, but this is immaterial so far as the action on the fibers is concerned.

Referring now to Figure 4, we have indicated the entire machine so far described, diagrammatically on a reduced scale with the feed rollers 26 and 28 and the operating mechanism within the rectangle at 134. The issuing fiber, in the case of hemp, is in a thin flat band of width substantially equal to the width of the machine, and in a machine with a working width of from 15 to 18 inches, of a volume sufficient to gather into a rope-like strand of a diameter of about an inch or an inch and a half when not compressed with any material force. The reel 136 is removably mounted on a spindle 138 with a light friction connection with the spindle as by means of a light cupshaped washer 140 and clamping nut 142. The spindle 138 is journaled in an arm 144 which is offset at 146 to enter a suitable bearing at 148, the axis of which bearing intersects the spindle 138 at right angles at substantially the center of the reel. The bearing 148 is supported in a stationary frame 150, which stationary frame also supports a beveled gear annulus 152. The spindle 138 carries a bevel pinion 154 meshing with the annulus 152. It will be apparent that rotation of the supporting arm 144 about the axis of the bearing 148 will rotate the entire reel about that axis and carry the pinion 154 in a planetary motion around the ring 152, which will rotate the spindle 138 and cause the reel 136 to wind up whatever material happens to be engaged with it. The drive pinion 155 may be actuated by any suitable source of power (not shown).

In the use of apparatus according to Figure 4, the operator feeding the stalks across the table 24 places a handful of stalks as indicated at 156, which handful includes only about one-third enough material to fill the machine to capacity. And then a second equal increment 158 is laid on the stalks 156 offset by about one-third the length of the stalks. And finally a third increment 160 is laid on top of the stalks 158 with a similar offset. It will be apparent that the repeated addition of these increments will cause the machine to be filled at all times, and that a continuous strand of more or less intermeshed fibers will issue from the machine. At the discharge end of the machine another operator can fasten the end of such a strand to the hub 162 of the reel 136, and then actuation of the pinion 154 will cause the issuing strand to be twisted spirally as indicated at 164 and wound onto the reel until the reel is full. The rate of twist of the strand can be regulated by governing the speed of the pinion 154, and the compactness with which the strand is wound onto the reel may be regulated by adjusting the tension of the cup washer 140. When the reel is filled, the operator can snip the strand in two and remove the reel and replace it with another one, and by the time he has done so enough additional material will have issued from the machine 134 ready for him to fasten the end of the strand to the hub of the next reel.

To adapt such a machine to work on either hemp or on flax or other fiber, it is desirable to vary the clearance between the breaker bar and its guides, so that when the bar is in either extreme position, the clearance between the metal parts is sufficient to accommodate the volume of fiber involved without pinching or injuring the fiber and still without leaving any substantial clearance in which hurds could remain without being displaced and torn from the fiber. In Figure 2 we have indicated slots at 162 for receiving the fastening bolts for the inlet gate, so that the clearance involved can be adjusted to suit the type of fiber and the volume being fed through.

Without further elaboration the foregoing will so fully explain our invention that others may, by applying knowledge current at the time of this application, readily adapt the same for use under various conditions of service.

What is claimed is:

1. Decorticating equipment including: feed rolls; a reciprocating breaker mechanism; a self-feeding scutching mechanism; and means for driving said rolls and mechanisms in synchronism; said feed rolls including a power-driven lower roll; an upper roll riding on the lower roll or the intervening material; resilient means for pressing said upper roll down on the material to grip the same; said breaker mechanism including a stationary guide frame defining an inlet gate and an outlet gate spaced from each other; said inlet gate having a lower lip extending into proximity to the lower feed roller; reciprocating breaker means in the space between said gates including upper and lower bars rigidly connected together and movable upwardly to bring the lower bar up between the upper portions of the gates, and downwardly to bring the upper bar between the lower portions of the gates; said scutching mechanism including a flexible belt overlying the path of the material; and a series of scutcher bars geared together to act seriatim in a predetermined sequence; each bar lying transverse to the path of movement of the material and having linear movement normal to its length in an eggshaped path, the upper portion of which brings the bar against the belt with a component of forward movement; a series of spaced supports between said scutcher bars adapted to prevent fibers below said belt from falling, but to permit separated hurds to fall through; and power transmission for driving the parts, with the speeds of said breaker and feed rolls such that successive breaks are separated by distances of the same order of magnitude as the diameter of the pieces of material, and the speed of said scutcher bars such that the fiber is kept up against the belt and substantially clear of said supports.

2. Decorticating equipment including: feed rolls; a reciprocating breaker mechanism; a self-feeding scutching mechanism; and means for driving said rolls and mechanisms in synchronism; said feed rolls including a power-driven lower roll; an upper roll riding on the lower roll or the intervening material; resilient means for pressing said upper roll down on the material to grip the same; said breaker mechanism including a stationary guide frame defining an inlet gate and an outlet gate spaced from each other; reciprocating breaker means in the space between said gates including upper and lower bars rigidly connected together and movable upwardly to bring the lower bar up between the upper portions of the gates, and downwardly to bring the upper bar between the lower portions of the gates; said bars being of less thickness than the space between said gates to leave clearance for the flexed fiber; said scutching mechanism including a flexible belt overlying the path of the material; and a series of scutcher bars geared together to act seriatim in a predetermined sequence; each bar lying transverse to the path of movement of the material and having linear movement normal to its length in an eggshaped path, the upper portion of which brings the bar against the belt with a component of forward movement; and power transmission for driving the parts.

3. Decorticating equipment including: feed rolls; a breaker mechanism; and a self-feeding scutching mechanism; and means for driving said rolls and mechanisms in synchronism; said scutching mechanism including a flexible belt overlying the path of the material; and a series of scutcher bars geared together to act seriatim in a predetermined sequence; each bar lying transverse to the path of movement of the material and having linear movement normal to its length in an eggshaped path, the upper portion of which brings the bar against the belt with a component of forward movement.

CARL J. DELEGARD.
RUDOLPH KREUTZ.